(12) United States Patent
Kleinsasser

(10) Patent No.: US 6,477,984 B1
(45) Date of Patent: Nov. 12, 2002

(54) GATE ASSEMBLY FOR CONFINING ANIMALS IN AN ALLEY

(75) Inventor: Jonathan Kleinsasser, Manitoba (CA)

(73) Assignee: Crystal Spring Colony Farms Ltd., Manitoba (CA)

( * ) Notice: Subject to any disclaimer, the term of this patent is extended or adjusted under 35 U.S.C. 154(b) by 0 days.

(21) Appl. No.: 09/943,760

(22) Filed: Sep. 4, 2001

(51) Int. Cl.⁷ ................................................. A01K 3/00
(52) U.S. Cl. ...................................................... 119/510
(58) Field of Search ................................. 119/510, 437, 119/444, 445, 446, 453, 474, 502, 503, 504, 505, 507, 512, 513, 514, 516, 519, 843

(56) References Cited

U.S. PATENT DOCUMENTS

| | | | | |
|---|---|---|---|---|
| 2,928,371 A | * | 3/1960 | Baker | 119/507 |
| 3,520,516 A | * | 7/1970 | Webster | 256/26 |
| 3,606,699 A | * | 9/1971 | Robinson, Jr. | 49/280 |
| 3,775,906 A | * | 12/1973 | Dougherty | 49/358 |
| 3,799,115 A | | 3/1974 | Fullerton et al. | |
| 3,908,599 A | | 9/1975 | Flocchini | |
| 4,520,592 A | * | 6/1985 | Holloway | 49/358 |

* cited by examiner

Primary Examiner—Charles T. Jordan
Assistant Examiner—Danielle Rosenthal
(74) Attorney, Agent, or Firm—Adrian D. Battison; Michael R. William; Ryan W. Dupuis

(57) ABSTRACT

Animals such as pigs which are free to otherwise roam in an alley are confined in the alley against movement past a gate assembly which includes a base with remotely steered and driven ground wheels for transporting the base along the alley floor between the alley sides. A planar barrier extending across the alley is carried by the base along the alley to a location where the animals are to be confined which has side edges shaped and arranged to co-operate with the alley sides and a bottom edge shaped and arranged to co-operate with the alley floor to close the alley against passage of the animals. The barrier can expand transversely to change its size to accommodate different width alleys and may have pivoting panel portions to close off non-vertical areas of the sides of the alley. A clamping arrangement is provided which may be on the barrier itself to engage the alley sides to clamp the gate assembly at the required position.

33 Claims, 4 Drawing Sheets

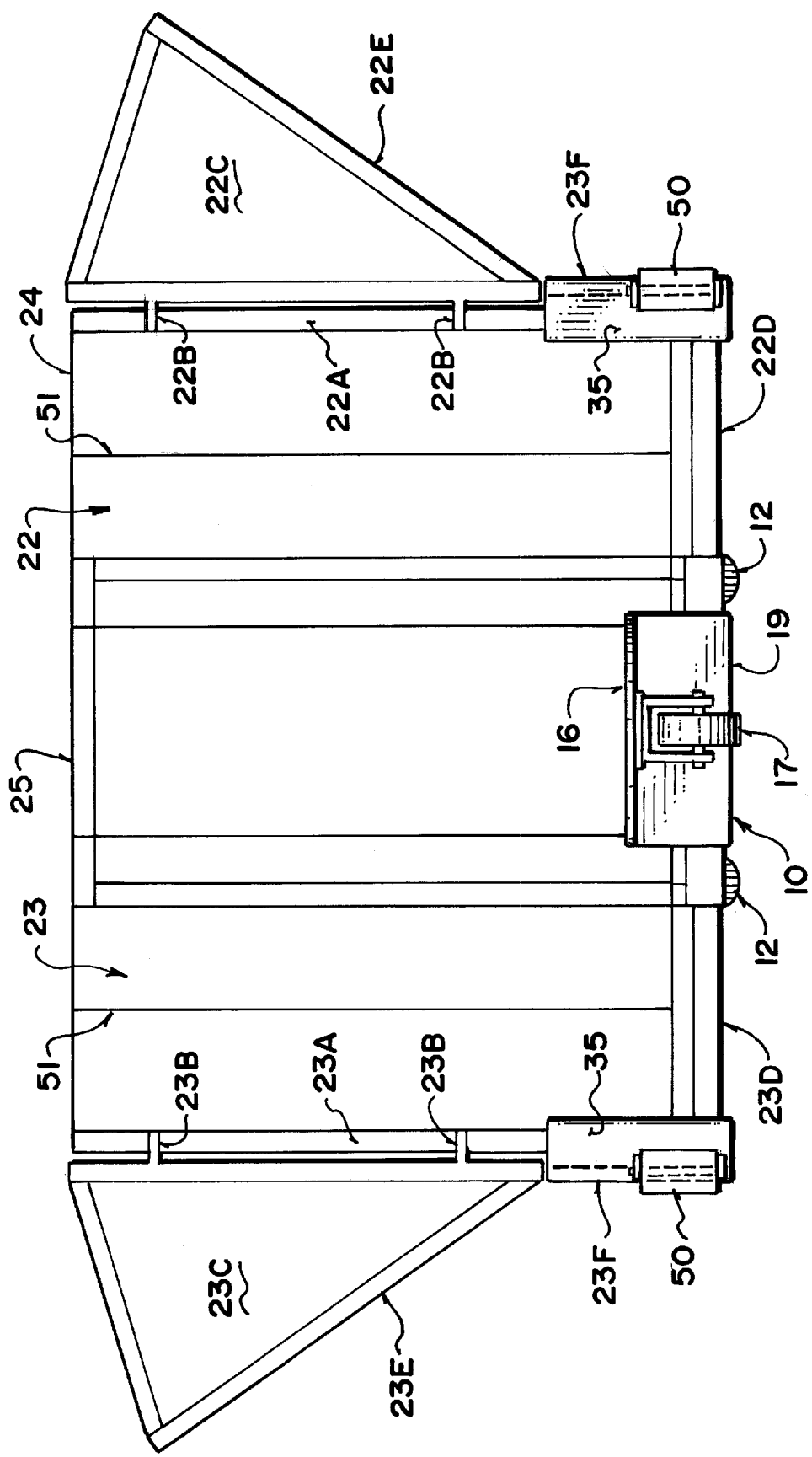

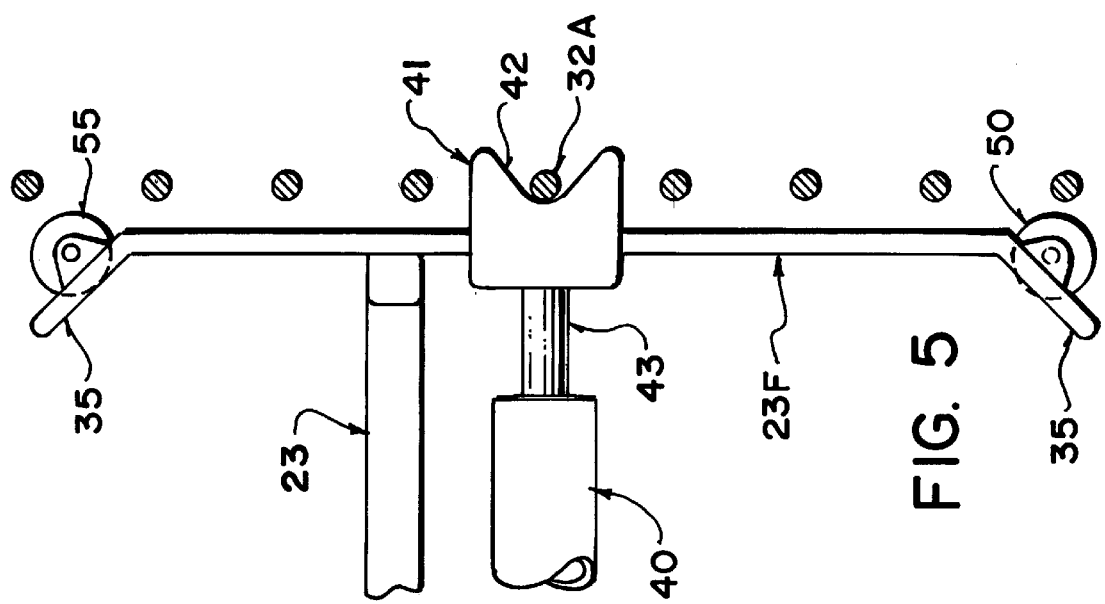
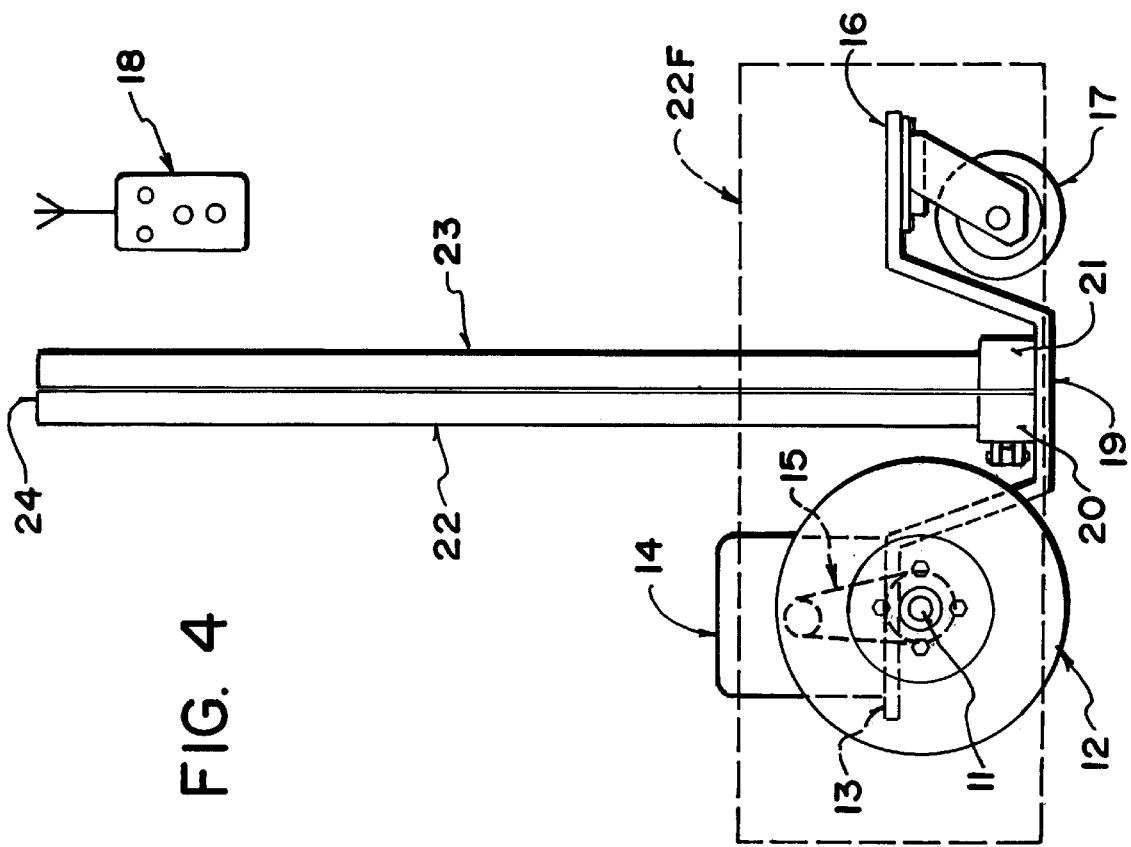

GATE ASSEMBLY FOR CONFINING ANIMALS IN AN ALLEY

This invention relates to a gate assembly for confining animals such as pigs in an alleyway or runway.

BACKGROUND OF THE INVENTION

In the intensive raising of animals particularly hogs it is well known that the hogs are kept in pens inside a building with alleyways between the pens. The alleyways are of course maintained as narrow as possible so as to avoid wasted space. In many cases there are a series of parallel alleyways across the building and end alleyways at the end of the building to allow transfer from one alleyway to the next.

The alleyways provide access for the animal handler in carrying out the various tasks that are necessary and allowing the handler to traverse from pen to pen. In addition the alleyways allow animals to be transferred from one pen to another as their status in the breeding cycle changes.

In is conventional to control animals within the alleyways by providing gates across the alleyway at particular locations as required. In many cases the gates simply comprise a transverse lightweight barrier which is lifted and carried by the animal handler and located at a required position in the alleyway on suitable mountings at the sides of the alleyway. Thus in some cases it is required to cause the animal to enter the alleyway at a particular location, to move along the alleyway and to depart at a second location. For this purpose the animal handler can provide two gates which confine the animal or animals to the required portion of the alleyway and prevent them from escaping beyond the required locations.

In an alternative use of such gates, they can be used to confine an animal to a required position within the alleyway and particularly to confine a boar in the alleyway at a required location adjacent to a number of sows to be artificially inseminated. When those sows are attended to, it is necessary to move the boar to a next section of the alleyway and this is done by lifting and moving the gates to the new required location. At the same time the boar is lead into the new location where it is confined by the newly positioned gates.

In all of these arrangements it is necessary, where minimum number of persons are used, for the handler to break off from his activities and to lift and move the gates to the new required locations. In other management regimens, additional handlers are used simply to manage the position of the gates this of course significantly increases labour costs.

One alternative technique to the conventional gating system has been to provide a cart which actually carries the animal concerned along the alleyway. Examples of such carts are shown in U.S. Pat. no. 6,196,975 (Labrecque) issued Mar. 6$^{th}$ 2001 and in Canadian patent 2,284,395 (Kleinsasser).

An alternative arrangement for moving an animal to a required location is shown in U.S. Pat. No. 6,142,102 (Mack) issued Nov. 7$^{th}$ 2000 which comprises a remote controlled robot which simply provides a locating point for a tether so that the boar is lead along the alley in response to movements of the robot.

In an alternative arrangement for use in crowding animals along a runway there are provided barriers carried on rails so that the barrier is suspended from the rail into the runway and moves along the runway on the rails to crowd the animals along the runway to a required location for example for milking. Such crowding devices are conventionally used in dairy operations and examples are shown in United States Patents:

| | | |
|---|---|---|
| 5,622,141 | Lareva | Issued April 22, 1997 |
| 3,908,599 | Flocchini | Issued September 30, 1975 |
| 3,799,115 | Fullerton et al. | Issued March 26, 1974 |

SUMMARY OF THE INVENTION

It is one object of the present invention, therefore, to provide an improved gate assembly for confining animals such as pigs in an alleyway or runway.

According to a first aspect of the invention, therefore, there is provided a gate assembly for confining animals in an alley having an alley floor and two alley sides, the gate assembly comprising:

a base shaped and arranged for location in the alley between the alley sides;

ground wheels on the base for transporting the base along the alley, the ground wheels being arranged to run on the alley floor between the alley sides;

a motor operable by a user for driving at least one of the ground wheels for causing movement along the alley;

and a barrier carried by the base for movement therewith along the alley, the barrier being shaped and arranged to co-operate closely with the alley sides to close the alley against passage therealong past the gate assembly by the animals.

In one arrangement where the sides of the alley are not vertical, the barrier may include side edges portions which are shaped to define non-vertical portions configured to match the shape of the alley sides. In particular, these side edges portions may be inclined upwardly and outwardly to match the shape of conventional pens which are similarly inclined away from the front of the pen at the alley.

In this arrangement, the barrier includes a main barrier portion attached to the base and the side edge portions may be formed on barrier panel portions which are movable, for example by folding, relative to a main portion of the barrier so as to change the end elevational shape of the barrier.

Preferably the barrier consists of simply a generally planar panel arranged to extend at right angles to the alley.

Preferably the motor is controlled by a remote control operable by the user and at least one of the ground wheels is steerable under control of the user so that the user can control the movement and location of the gate assembly from a remote location while engaged in other related tasks. For this purpose, the gate assembly may include side guide members for engaging the sides of the alley for guiding movement of the gate assembly in the alley.

Preferably the barrier is expandable side to side to increase the width thereof between the sides of the alley to accommodate different width alleys and in some cases for engaging the sides of the alley for clamping the gate assembly at a required position in the alley when movement is halted.

In the alternative there may be provided clamping members separate from the barrier which are movable relative to the base to effect clamping of the gate assembly to the sides of the alley at a required position in the alley when movement is halted.

According to a second aspect of the invention there is provided a method for confining animals in an alley comprising:

providing an alley having an alley floor and two alley sides;

locating one or more animals in the alley free to move along the alley on the floor and across the alley between the sides;

providing a gate assembly comprising:

a base shaped and arranged for location in the alley between the alley sides;

ground wheels on the base for transporting the base along the alley, the ground wheels being arranged to run on the alley floor between the alley sides;

a motor operable by a user for driving at least one of the ground wheels for causing movement along the alley;

and a barrier carried by the base for movement therewith along the alley, moving the base along the alley to a position at which the animals are to be confined;

arranging the barrier so as to have side edges shaped and arranged to co-operate with the alley sides and a bottom edge shaped and arranged to co-operate with the alley floor to close the alley against passage therealong past the gate assembly by the animals within the alley otherwise free to move within the alley.

BRIEF DESCRIPTION OF THE DRAWINGS

Embodiments of the invention will now be described in conjunction with the accompanying drawings, in which:

FIG. 3 is a front elevational view of a gate assembly similar to that of FIG. 1 with some modifications.

FIG. 4 is a side elevational view of the gate assembly of FIG. 1.

FIG. 5 is a partial top plan view of a further modified arrangement.

In the drawings like characters of reference indicate corresponding parts in the different figures.

DETAILED DESCRIPTION

Figure 2:
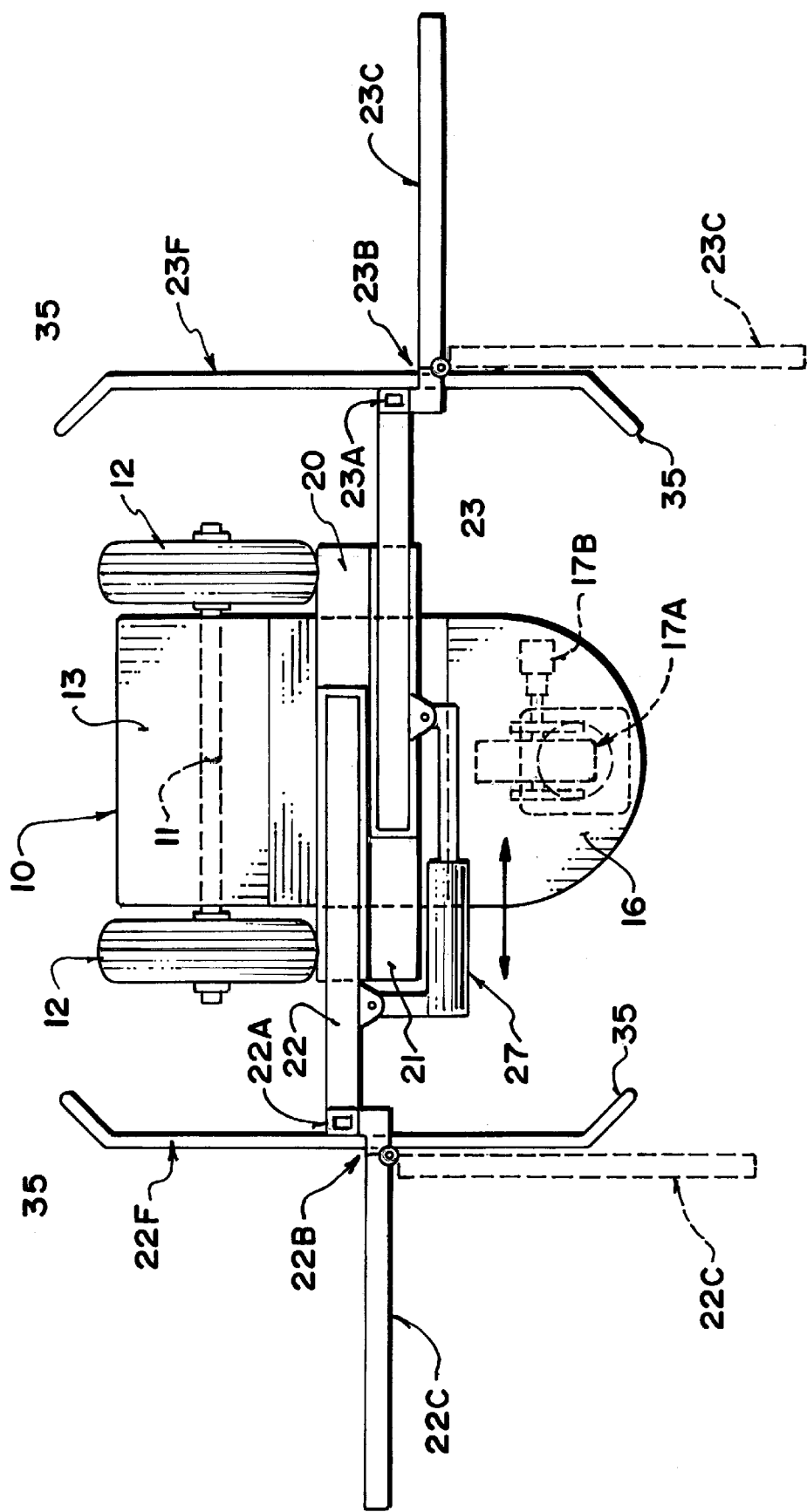
FIG. 2 is a top plan view of the gate assembly of FIG. 1.

The gate assembly best shown in FIG. 2 comprises a base member 10 which is shaped to define a frame. At the rear of the frame is provided a transverse axle 11 carrying a pair of ground wheels 12 by which the frame can be moved across the ground. The axle extends across a rear raised portion 13 of the frame as best shown in FIG. 4. The axle 11 is driven by a motor assembly 14 mounted on the raised portion 13 of the frame at the rear above the axle. A suitable drive coupling 15 is provided between the motor assembly and the axle and this coupling can include a simple clutch arrangement by which the user can release the clutch so as to disconnect the axle from the motor and allow the whole assemble to be moved manually simple clutch arrangements can be provided including for example a simple release or slackening of the belt which provides a suitable coupling.

At the front of the frame is provided a further raised section 16 on which is mounted a wheel 17 which extends underneath the raised front section 16 to the ground so that the frame is mounted for movement across the ground on the rear wheels 12 and the front wheel 17.

The front wheel 17 can comprise a simple caster wheel which allows the gate assembly to move in a direction determined by guiding elements separate from the wheels. Alternatively as shown in FIG. 2 the wheel indicated at 17A may be steered by a steering mechanism schematically indicated at 17B. The motor assembly 14 and the steering device 17B can be operated by the user utilizing a remote control 18 which includes conventional suitable control buttons or the like which allow the motor to be driven in forward or rearward directions thus driving the frame forwardly and which allowed the steering, if provided, to be controlled to left and right.

Figure 1:
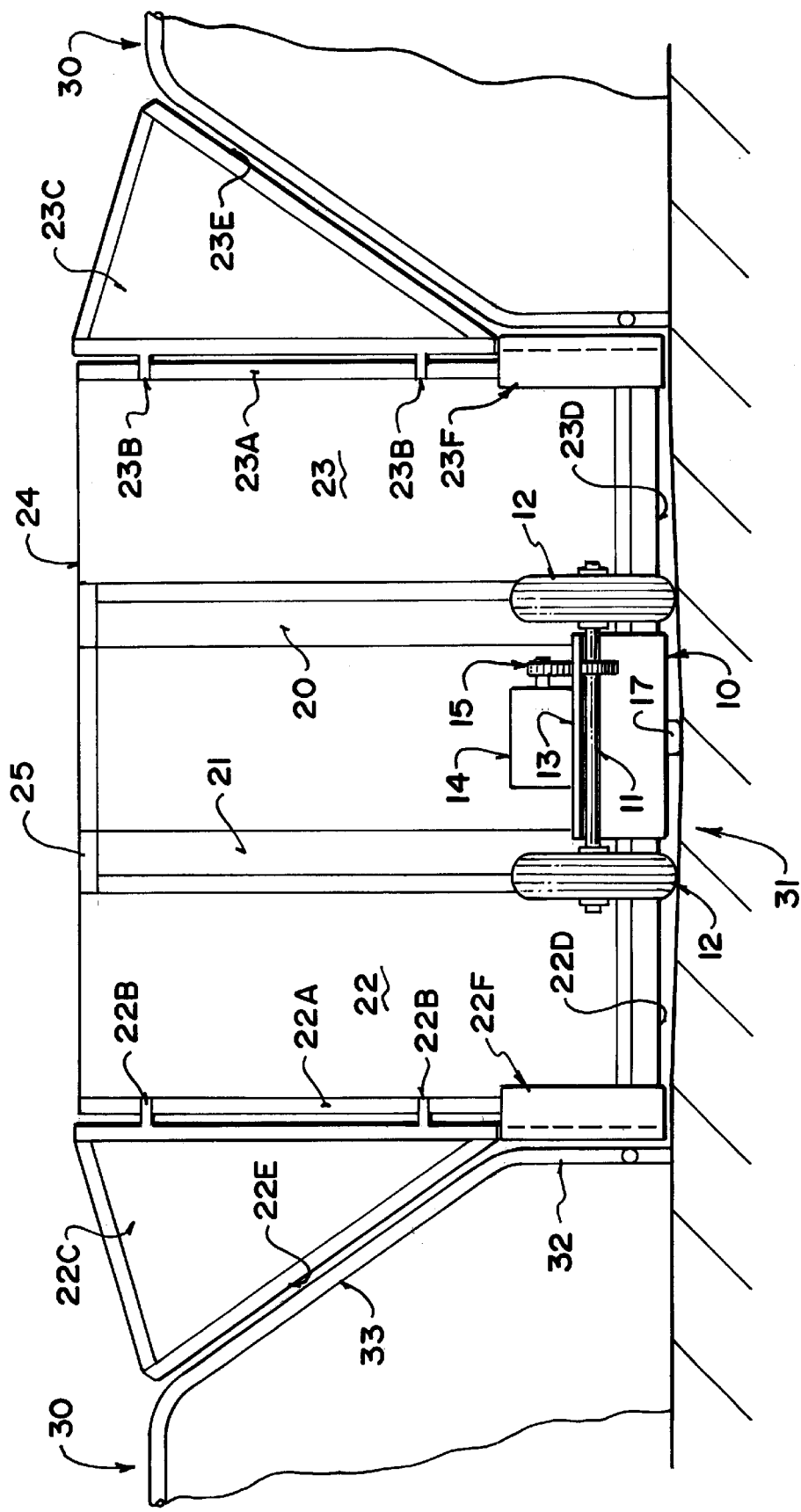
FIG. 1 is a rear elevational view of a gate assembly according to the present invention.

As shown in FIG. 4 a central lowered section 19 of the frame extends across the base in between the wheels at a height just above the floor. The central section 19 provides a simple horizontal panel along which is mounted a pair of support tracks 20 and 21 each supporting a respective one of a pair of gate panels 22 and 23. The tracks are arranged simply at the base and provide sufficient support to hold the gate panels 22 and 23 standing upwardly from the frame to a top edge 24 of sufficient height to prevent an animal for which the gate assembly is designed from attempting to climb over the gate assembly. The track supports 20 and 21 for the gate panels may, if required, stand upwardly from the frame to a height equal to the top edge 24 so as to provide more structural stability for the gate assembly and the gate panels 22 and 23. This arrangement is shown in FIG. 1 where the central tracks extend upwardly to a top frame member 25.

The gate panel 22 and 23 can slide inwardly and outwardly relative to the frame in the guide tracks 21 and 22. This sliding action can be effected manually so as to adjust the gate panels to a required width matching that of the alley with which the gate assembly is to be used. In the alternative, the gate panels can slide inwardly and outwardly by a linear actuator 27 also actuable by the remote control 18.

At the outside edge of each of the gate panels 22 and 23 is provided a vertical post 22A, 23A. Onto this post is mounted a hinge coupling 22B, 23B each of which carries a respective supplementary gate panel 22C, 23C. The hinge coupling allows the supplementary panel to pivot from an extended position in which it extends outwardly from the respective gate panel to a retracted position in which it lies at right angles to that gate panel. In the retracted position of the supplementary panels, therefore, the shape of the gate assembly in its outer periphery defined by a bottom edge 22D, 23D of each of the gate panels, the outer post 22A and 23A and the top edge 24, 25 is rectangular with a width arranged to substantially match the width of the alley and a height sufficient to prevent the animals from escaping over the gate assembly. The width can of course be adjusted as explained previously to match wider or narrower alleys as required. The width can also be retracted for transportation around corners and through doorways.

The supplementary panels 22C and 23C are shaped in the embodiment as shown so that the outside edge extends upwardly and outwardly as indicated at 22E, 23E. This shape is selected to match the conventional shape of sow pens indicated generally at 30 which are arranged on either side of the alleyway 31. Such pens conventionally include a front vertical section 32 which extends upwardly to a height approximating the shoulders of the animal and from that position the pen extends upwardly and rearwardly as indicated at 33. This conventional shape is widely used for gestation stalls since it gives the animal room to move forwardly and rearwardly but tends to confine the animal rearwardly towards the back of the pen and away from the alley 31.

The supplementary panels therefore provide a portion extending over the incline section 33 so as to leave no open area across the alley which could give incentive to a confined animal to attempt to escape through that opening. It will be appreciated that, even if the animal cannot actually escape through such a narrow opening, any possibility of escape could lead the animal, when panicked, to attempt to get through a narrow opening and become trapped or injured in the attempt.

While the supplementary panels 22C and 23C are shown as generally triangular in shape, other shapes can be provided if necessary to match a particular required shape of an alley where the basic shape is rectangular but additional portions are necessary to fill parts of the alley where the side walls are not vertical.

The posts 22B and 23B at the outer edges of the gate panels also carry side guide plates 22F and 23F. These extend generally at right angles to the gate panel longitudinally to the direction of movement and of a length sufficient to extend to the front and rear of the base 10. The side plates 22F (shown in phantom in FIG. 4) and 23F include front and rear in turned sections 35 which are inclined inwardly so as to act as bumpers or guides in the event that the side plate impacts the side of the alley or an obstacle within the alley thus tending to guide the gate assembly along the alley as it moves on the ground wheels. The height of the side plates is approximately equal to the height of the base so as to extend to the top of the motor and thus provide a protection for the base. The side plates may be associated with cover plates which extend horizontally over the base and which also slide inwardly and outwardly with the gate panels although this is in most cases not necessary. The side plates may be replaced or supplemented by rollers which run along the front face of the pens or along a track at the floor to provide a guiding action.

The linear actuator 27 is thus used in one example so that the gate panels and their associated side plates are retracted slightly from the side walls of the alley during movement of the gate assembly along the alley so that the movement is guided by the side plates contacting the side walls of the alley and/or by the operator steering the base. When movement to a required position is completed, the actuator 27 is actuated automatically or by the operator to extend the gate panels outwardly so as to engage the side plates 22F and 23F against the respective side wall of the alley thus providing a clamping action tending to hold the gate assembly fixed in place in the alley. Sufficient friction can be provided by the clamping force to prevent or restrict the sliding movement of the gate assembly along the alley even when vigorously pushed by the animal. When the next movement is required, the gate panels are again slightly retracted to release the clamping action. Complete retraction to the narrower position at the wheels generally is not effected during movement along the alley since this would provide a potential escape route for the animal with a danger of injury to the animal and to the animal handler.

In an alternative arrangement shown in FIG. 5, the adjustment of the position of the gate panels is effected manually and is then fixed at the required width to match the alley concerned. The width is selected so that the side guide plates are slightly spaced inwardly from the side walls of the alley so that the gate assembly can move without jamming within the alley. In this arrangement the position of the gate assembly in the alley is locked by an additional locking member generally indicated at 40 which is mounted on one or both sides of the gate assembly and includes a clamp member 41 which is arranged with a notch 42 to engage around a bar 32A or the pens 30. The clamping assembly 40 includes an actuator and a rod 43 of that actuator which moves the clamping member 41 from a clamping position as shown in FIG. 5 to a retracted position withdrawn within the respective side plate so as to allow the movement without interfering with the bars 32A. A similar clamping member can be provided on the opposite side at the plate 22F which operates on the same actuator so as to move a similar clamping member into engagement with the bars on the opposite side. A suitable linkage using a single actuator to drive both clamping members can be designed by one skilled in the art. Although the clamping member as shown which engages onto bars can be used, an alternative arrangement may simply provide fingers which project outwardly a sufficient distance to engage between the bars to interfere with the device from being pushed along the alley by the animal. This has no clamping action but avoids the device from being pulled along the alley by the clamping action thus reducing the force necessary from the actuator. The member carrying the fingers can be adjustable in width with the panels so that the width of the device is adjusted to accommodate the width of the alley concerned from which position the fingers move outwardly just sufficient to engage between the bars.

The gate assembly is moved to a required location in an alley and cooperates with one or more similar gate assemblies which are moved to respective positions in the alley so as to confine the animals concerned to the area in the alley between the two gate assemblies. This can be used to maintain an animal temporarily in the alley while given it freedom to move between the two gate assemblies or it may be used to confine animals in a path leading from one pen to another pen along the alley so that the animals when driven from the pen tend to move along the alley to the required second pen.

The gate assembly thus comprises the base 10 and the gate panels as described previously. In the arrangement as shown the base is arranged centrally of the gate panels so that the base tends to move along the center of the alley on the floor of the alley. However in an alternative arrangement (not shown) the base can be offset to one side so that it is closely adjacent one side of the alley. In such an arrangement only a single movable gate panel may be provided at the long side which cooperates with a single fixed gate panel at the short side. In this arrangement the gate panel to the long side may be retractable or pivotal about a vertical axis to a position in which it can open the alley and allow passage of the animal or the handler through the open gate panel on the long side of the offset base.

In FIG. 3 and is shown in addition to the arrangement described above rollers 50 which are positioned at the front and rear of each plate 23F so as to engage the sides of the alley to prevent the possibility of jamming of the plates diagonally in the alley should the structure twist. These rollers are mounted on the angled sections of the plates and stand upwardly for rotation about a vertical axis.

Also as shown in FIG. 3, the panels 23 are divided into two sections at a vertical dividing line 51 allowing the panels to slide or collapse transversely in four pieces, two outermost and two inner pieces at three dividing lines so as to allow collapse of the width from a maximum of the order of 4 feet to a minimum of the order of 1.5 feet.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A gate assembly for confining animals in an alley having an alley floor and two alley sides, the gate assembly comprising:
   a base shaped and arranged for location in the alley between the alley sides;
   ground wheels on the base for transporting the base along the alley, the ground wheels being arranged to run on the alley floor between the alley sides;
   a motor operable by a user for driving at least one of the ground wheels for causing movement along the alley;
   and a barrier carried by the base for movement therewith along the alley, the barrier being shaped and arranged to co-operate closely with the alley sides to close the alley against passage therealong past the gate assembly by the animals;
   the ground wheels projecting downwardly below a bottom edge of the barrier such that the ground wheels run on the alley floor with the barrier standing upwardly from the base.

2. The gate assembly according to claim 1 wherein the barrier includes side edges portions which are shaped to define non-vertical portions configured to match the shape of the alley sides.

3. The gate assembly according to claim 2 wherein the side edge portions are inclined upwardly and outwardly.

4. The gate assembly according to claim 2 wherein the barrier includes a main barrier portion attached to the base and the side edge portions are formed on barrier panel portions which are movable relative to the main barrier portion.

5. The gate assembly according to claim 4 wherein the barrier panel portions fold relative to the main barrier portion.

6. The gate assembly according to claim 1 wherein the motor is controlled by a remote control operable by a user and wherein at least one of the ground wheels is steerable side to side under control of the user so as to steer the direction of movement of the base in side to side directions as the base moves along the alley.

7. The gate assembly according to claim 1 wherein there is provided side guide members which are carried by the gate assembly for movement therewith along the alley and are arranged at respective sides of the gate assembly for engaging respective sides of the alley for guiding movement of the gate assembly in the alley.

8. The gate assembly according to claim 1 wherein the barrier is expandable side to side to increase the width thereof between the sides of the alley.

9. The gate assembly according to claim 1 wherein the gate assembly includes clamping members carried on the gate assembly for movement therewith along the alley and mounted on the gate assembly for movement relative thereto so as to engage the sides of the alley for clamping the gate assembly at a required position in the alley when movement is halted.

10. A gate assembly for confining animals in an alley having an alley floor and two alley sides, the gate assembly comprising:
    a base shaped and arranged for location in the alley between the alley sides;
    ground wheels on the base for transporting the base along the alley, the ground wheels being arranged to run on the alley floor between the alley sides;
    a motor operable by a user for driving at least one of the ground wheels for causing movement along the alley;
    and a barrier carried by the base for movement therewith along the alley, the barrier being shaped and arranged to co-operate closely with the alley sides to close the alley against passage therealong past the gate assembly by the animals;
    wherein the barrier includes side edges portions which are shaped to define non-vertical portions configured to match the shape of the alley sides.

11. The gate assembly according to claim 10 wherein the side edge portions are inclined upwardly and outwardly.

12. The gate assembly according to claim 10 wherein the barrier includes a main barrier portion attached to the base and the side edge portions are formed on barrier panel portions which are movable relative to the main barrier portion.

13. The gate assembly according to claim 12 wherein the barrier panel portions fold relative to the main barrier portion.

14. The gate assembly according to claim 10 wherein the motor is controlled by a remote control operable by a user and wherein at least one of the ground wheels is steerable side to side under control of the user so as to steer the direction of movement of the base in side to side directions as the base moves along the alley.

15. The gate assembly according to claim 10 wherein there is provided side guide members which are carried by the gate assembly for movement therewith along the alley and are arranged at respective sides of the gate assembly for engaging respective sides of the alley for guiding movement of the gate assembly in the alley.

16. The gate assembly according to claim 10 wherein the gate assembly includes clamping members carried on the gate assembly for movement therewith along the alley and mounted on the gate assembly for movement relative thereto so as to engage the sides of the alley for clamping the gate assembly at a required position in the alley when movement is halted.

17. A gate assembly for confining animals in an alley having an alley floor and two alley sides, the gate assembly comprising:
    a base shaped and arranged for location in the alley between the alley sides;
    ground wheels on the base for transporting the base along the alley, the ground wheels being arranged to run on the alley floor between the alley sides;
    a motor operable by a user for driving at least one of the ground wheels for causing movement along the alley;
    and a barrier carried by the base for movement therewith along the alley, the barrier being shaped and arranged to co-operate closely with the alley sides to close the alley against passage therealong past the gate assembly by the animals;
    wherein the barrier is expandable side to side to increase the width between side edges thereof.

18. The gate assembly according to claim 17 wherein the side edges include side edge portions which are inclined upwardly and outwardly.

19. The gate assembly according to claim 18 wherein the barrier includes a main barrier portion attached to the base and the side edge portions are formed on barrier panel portions which are movable relative to the main barrier portion.

20. The gate assembly according to claim 19 wherein the barrier panel portions fold relative to the main barrier portion.

21. The gate assembly according to claim 17 wherein the motor is controlled by a remote control operable by a user and wherein at least one of the ground wheels is steerable side to side under control of the user so as to steer the direction of movement of the base in side to side directions as the base moves along the alley.

22. The gate assembly according to claim 17 wherein there is provided side guide members which are carried by the gate assembly for movement therewith along the alley and are arranged at respective sides of the gate assembly for engaging respective sides of the alley for guiding movement of the gate assembly in the alley.

23. The gate assembly according to claim 17 wherein the gate assembly includes clamping members carried on the gate assembly for movement therewith along the alley and mounted on the gate assembly for movement relative thereto so as to engage the sides of the alley for clamping the gate assembly at a required position in the alley when movement is halted.

24. A method for confining animals in an alley comprising:

providing an alley having an alley floor and two alley sides;

locating one or more animals in the alley free to move along the alley on the floor and across the alley between the sides;

providing a gate assembly comprising:
  a base shaped and arranged for location in the alley between the alley sides;
  ground wheels on the base for transporting the base along the alley, the ground wheels being arranged to run on the alley floor between the alley sides;
  a motor operable by a user for driving at least one of the ground wheels for causing movement along the alley;
  and a barrier carried by the base for movement therewith along the alley, operating the motor to drive the ground wheels and causing the ground wheels to run along the alley floor to move the base and the barrier carried thereby along the alley to a position at which the animals are to be confined;

and arranging the barrier so as to have side edges shaped and arranged to co-operate with the alley sides and a bottom edge shaped and arranged to co-operate with the alley floor to close the alley against passage therealong past the gate assembly by the animals within the alley otherwise free to move within the alley.

25. The method according to claim 24 wherein the barrier includes side edge portions which are shaped to define non-vertical portions configured to match the shape of the alley sides.

26. The method according to claim 25 wherein the side edge portions are inclined upwardly and outwardly.

27. The method according to claim 25 wherein the barrier includes a main barrier portion attached to the base and the side edge portions are formed on barrier panel portions which are movable relative to the main barrier.

28. The method according to claim 27 wherein the barrier panel portions fold relative to the main barrier portion.

29. The method according to claim 24 including remotely controlling the motor and remotely controlling side to side steering of the ground wheels so as to steer the direction of movement of the base in side to side directions as the base moves along the alley.

30. The method according to claim 24 including guiding movement of the gate assembly in the alley by engaging the sides of the alley side by guide members carried on the gate assembly and movable therewith along the alley.

31. The method according to claim 24 including expanding the barrier side to side to increase the width thereof between the sides of the alley.

32. The method according to claim 31 wherein the barrier carries clamping members which engage the sides of the alley when expanded to clamp the gate assembly at a required position in the alley when movement is halted.

33. The method according to claim 24 including clamping the gate assembly to the sides of the alley at a required position in the alley, when movement is halted, by clamping members which are carried on the gate assembly for movement therewith along the alley and mounted on the gate assembly for movement relative thereto so as to engage the sides of the alley.

* * * * *